UNITED STATES PATENT OFFICE.

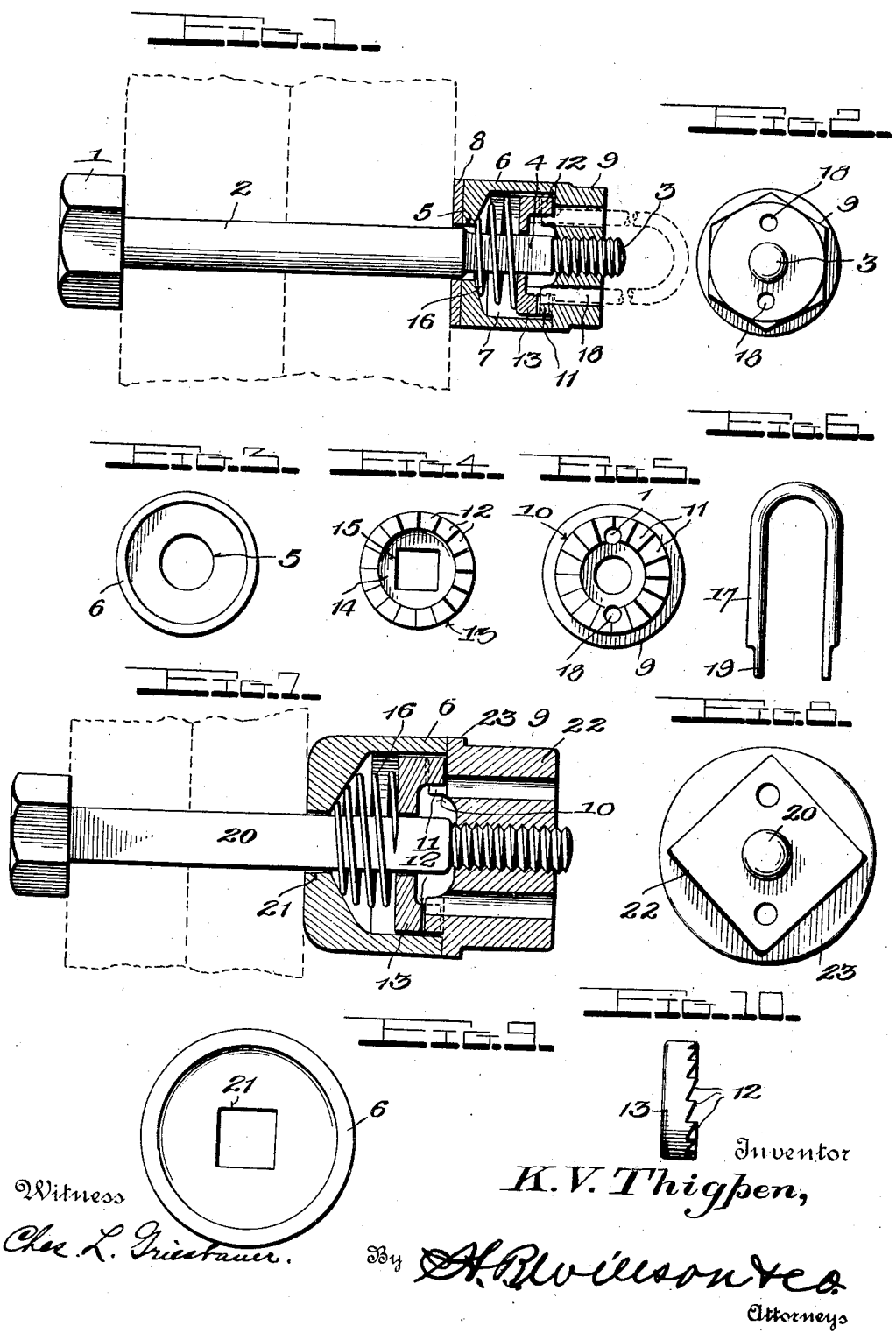

KIT VONLON THIGPEN, OF GREENSBORO, NORTH CAROLINA, ASSIGNOR OF ONE-HALF TO SAMUEL SANDELIN, OF GREENSBORO, NORTH CAROLINA.

NUT-LOCK.

1,246,353.      Specification of Letters Patent.      Patented Nov. 13, 1917.

Application filed January 3, 1916, Serial No. 69,899. Renewed August 17, 1917. Serial No. 186,828.

*To all whom it may concern:*

Be it known that I, KIT VONLON THIGPEN, a citizen of the United States, residing at Greensboro, in the county of Guilford and State of North Carolina, have invented certain new and useful Improvements in Nut-Locks; and I do declare the following to be a full, clear, and exact description of the invention, such as will enable others skilled in the art to which it appertains to make and use the same.

This invention relates generally to improvements in nut locks and more particularly to that class of nut locks in which the nut is coupled to the bolt.

The primary object of the invention is to provide a closed casing containing a latch mechanism for locking nuts against rotation on bolts, which latch mechanism may be released from engagement with the nuts by the insertion of a suitable key.

Another object of the invention is to provide a means whereby the nuts are automatically locked as they are inserted upon the bolts.

A still further object resides in the provision of a device which will be simple, strong, durable and inexpensive in construction, efficient and reliable in operation, and well adapted to the purpose for which it is designed.

In the accompanying drawings forming a part of the specification, in which similar reference characters indicate like parts throughout the several views:

Figure 1 is a longitudinal sectional view of a device constructed in accordance with this invention;

Fig. 2 is a front elevation of the outer end of the nut member;

Fig. 3 is a front elevation of the outer end of the washer member;

Fig. 4 is a similar view of the outer end of the locking block;

Fig. 5 is a similar view of the inner end of the nut member;

Fig. 6 is a side elevation of the key;

Fig. 7 is a longitudinal sectional view of a slightly modified form of the invention;

Fig. 8 is a front elevation of the outer end of the nut member of the modified form;

Fig. 9 is a similar view of the outer end of the washer member; and

Fig. 10 is a side elevation of the locking block.

In the embodiment illustrated, 1 represents the head and 2 the shank portion of a bolt to which this invention is designed to be applied. The shank portion 2 of this bolt is provided with the usual screw threaded end 3, but is further provided with a squared portion 4 adjacent the threaded end 3, the purpose of which will be hereinafter set forth.

After the shank portion 2 of the bolt has been extended through the object which it is designed to clamp together, the former is inserted through the central opening 5 disposed in the inner end of a suitable casing or washer 6, the outer end of which is provided with a circular recess 7. As clearly shown, the bottom of the recess 7 is inclined inwardly from its sides to its center, to receive a spring to be hereinafter described. This washer 6 may be of any desired configuration, but is preferably cylindrical as clearly shown by Fig. 3 of the drawing. If desired, an ordinary flat washer 8 may be disposed between the cylindrical washer 6 and the objects to be clamped. However, this is a matter of expediency and forms no part of the present invention.

Disposed on the threaded end 3 of the bolt is a hexagonal nut 9, the inner end of which is provided with an annular flange 10. This flange 10 is spaced from the outer edges of the nut and is provided with a series of ratchet teeth 11, the latter coöperating with a similar series of ratchet teeth 12 arranged on an annular flange 13 which extends outwardly from the outer or adjacent face of a circular locking block 14. This locking block 14 has a centrally disposed square shaped aperture 15 through which the squared shank portion 4 of the bolt is inserted, thereby preventing the former from rotating with respect to the latter. Surrounding the squared shank portion 4 of the bolt is a cone-shaped spiral spring 16, the smaller inner end of which abuts against the extreme bottom of the recess in the casing 6, while its larger outer end abuts against the inner face of the block 14. By this arrangement, it may be clearly seen that the spring 16, being constantly under tension, forces the block 14 outwardly and yieldably holds the ratchet teeth 12 carried by the latter in engagement with those carried by the nut 9. The inner end of the spring 16 is substantially equal in diameter to the distance across the squared portion 4 of the bolt so that when the locking block 14 is moved to its innermost position, said spring will be compressed into substantially flat form and be completely housed within the inclined bottom of the recess 7. It may also be seen that it is only necessary to turn the nut to apply it to the bolt, as the beveled faces of the ratchet teeth 11 and 12 intermittently force the block 14 inwardly. However, as the block 14 is non-rotatably mounted on the squared shank portion 4 of the bolt, loosening or turning of the nut in the reverse direction is prevented.

To accomplish this last mentioned object, the arms or fingers 17 of the substantially U-shaped key are inserted through two longitudinally extending apertures 18 arranged on diametrically opposite sides of the nut 9 and having portions of their inner ends disposed slightly inwardly from the inner side of the flange 13, as most clearly shown by Figs. 1 and 7 of the drawings, to allow the free ends of these fingers 17, which have their outer edges reduced at 19, to clear the inner edges of the annular toothed flange 13 of the block and engage the smooth faces of the latter, whereby by a slight inward pressure upon said key, the block 14 may be forced inwardly until the teeth 11 and 12 are disengaged. The nut 9 may be then loosened and removed entirely from the bolt.

Figs. 7, 8 and 9 illustrate a slightly modified form of the invention, the bolt being provided with a squared shank 20, which obviously necessitates a square shaped aperture 21 in the casing or washer 6. As clearly shown in Fig. 8 of the drawing, the nut member 22 is square shaped and is provided with a circular flange or base plate 23 on its inner end which closes or covers the open recessed end of the washer 6 and prevents dust, dirt or the like from entering the same.

From the foregoing description taken in connection with the accompanying drawings, it is obvious that the objects of the invention have been effectively carried out. It will be seen that the various parts of the device are shaped and arranged with respect to one another so that the complete device is a very compact structure and can be manufactured as small as ordinary usage may require. This, however, is not true with regard to other devices now known made up of a considerable number of parts, as they generally have to be made so large that they are only capable of being used in connection with comparatively large bolts and nuts. However, it is to be noted that various changes in form and proportion may be resorted to without departing from the spirit of this invention, and hence I do not wish to limit myself to the construction herein shown other than that set forth in the appended claim.

I claim as my invention:

In a device of the class described, the combination with a bolt having a threaded end, and a squared portion adjacent the latter; of a washer surrounding the squared portion of said bolt and having an opening therein to provide for the passage therethrough of said bolt, and a circular recess in its outer end, the bottom of said recess inclining inwardly from its sides to its center, a locking block circular in configuration and having a square-shaped central opening to receive the squared portion of said bolt to provide a non-rotatable mounting upon the same, said block being substantially equal in diameter with said recess and slidable longitudinally on said bolt within the latter from its outer end to the outer end of the inclined bottom thereof, a cone-shaped spiral spring surrounding the squared portion of said bolt and having its larger end bearing against the inner face of said block, and its inner end resting against the extreme bottom of said recess and being substantially equal in diameter to the distance diagonally across the squared portion of said bolt, said spring being completely housed within the inclined bottom of said recess when compressed into substantially flat form when said locking block is in its innermost position in said recess, a nut disposed on the threaded end of said bolt and contacting with the outer recessed end of said washer, and annular flanges arranged on the adjacent faces of said nut and said locking block and having coöperating ratchet teeth on their edges for preventing rotation of said nut in one direction, said nut being provided with diametrically opposite longitudinally extending apertures, portions of the inner ends of which are disposed slightly inwardly of the inner side of the flange on said locking block to provide for the engagement of the reduced free ends of the spaced fingers of a block releasing key with the outer face of said locking block but preventing engagement of the ratchet teeth arranged on said block with said free ends of said fingers.

In testimony whereof I have hereunto set my hand in presence of two subscribing witnesses.

KIT VONLON THIGPEN.

Witnesses:
J. T. CARRUTHERS,
C. V. WEBSTER.

Copies of this patent may be obtained for five cents each, by addressing the "Commissioner of Patents, Washington, D. C."